(12) United States Patent
Breitenmoser et al.

(10) Patent No.: US 11,102,333 B2
(45) Date of Patent: Aug. 24, 2021

(54) DISTRIBUTING SOFTWARE AMONG HEARING DEVICES

(71) Applicant: SONOVA AG, Staefa (CH)

(72) Inventors: Andreas Breitenmoser, Zurich (CH); David Perels, Zurich (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 16/798,751

(22) Filed: Feb. 24, 2020

(65) Prior Publication Data

US 2020/0274949 A1 Aug. 27, 2020

(30) Foreign Application Priority Data

Feb. 27, 2019 (EP) .................................... 19159660

(51) Int. Cl.
*H04L 29/08* (2006.01)
*H04R 25/00* (2006.01)
*G06F 8/60* (2018.01)
*G06F 9/4401* (2018.01)

(52) U.S. Cl.
CPC ........... *H04L 67/34* (2013.01); *H04R 25/554* (2013.01); *G06F 8/60* (2013.01); *G06F 9/4401* (2013.01); *H04R 2225/55* (2013.01)

(58) Field of Classification Search
CPC .. H04R 25/554; H04R 2225/55; H04R 25/55; H04L 67/34; G06F 8/60; G06F 9/4401
USPC ....................................................... 709/217
See application file for complete search history.

(56) References Cited

U.S. PATENT DOCUMENTS

| | | | |
|---|---|---|---|
| 6,055,631 A | 4/2000 | Chadha | |
| 7,055,148 B2 | 5/2006 | Marsh et al. | |
| 7,086,049 B2 | 8/2006 | Goodman | |
| 7,882,341 B2 | 2/2011 | Rothman et al. | |
| 8,065,510 B2 | 11/2011 | Hanes | |
| 8,266,263 B2 | 9/2012 | Cain et al. | |
| 8,712,082 B2 | 4/2014 | Spieler et al. | |
| 8,938,610 B2 | 1/2015 | Khosravi et al. | |
| 10,068,451 B1* | 9/2018 | Werner | A61F 11/14 |
| 2003/0084435 A1 | 5/2003 | Messer et al. | |

(Continued)

FOREIGN PATENT DOCUMENTS

| DE | 19949604 | 7/2004 |
|---|---|---|
| DE | 102005012975 | 8/2006 |

(Continued)

*Primary Examiner* — Tu T Nguyen
(74) *Attorney, Agent, or Firm* — ALG Intellectual Property, LLC (57) ABSTRACT

A hearing system comprising a hearing device and a connected device, wherein the hearing device comprises a microphone; a processor for processing a signal from the microphone; an output device for outputting the processed signal to an ear of the user; a memory for storing program code modules to be processed by the processor; and a transceiver for exchanging data with the connected device. In the memory of the hearing device a first set of program code modules and in the memory of the connected device a second set of program code modules different from the first set is stored. A program code module of the second set of program code modules is transferred from the connected device to the hearing device upon request from the hearing device or the connected device.

12 Claims, 3 Drawing Sheets

(56) References Cited

U.S. PATENT DOCUMENTS

| | | | |
|---|---|---|---|
| 2007/0036373 A1* | 2/2007 | Townsend | H04M 1/6016 |
| | | | 381/312 |
| 2008/0298615 A1* | 12/2008 | Klinkby | H04R 25/453 |
| | | | 381/318 |
| 2009/0271780 A1 | 10/2009 | B. et al. | |
| 2016/0127842 A1* | 5/2016 | Perels | H04R 25/305 |
| | | | 381/23.1 |
| 2017/0078809 A1 | 3/2017 | Solum et al. | |
| 2018/0167368 A1* | 6/2018 | Vendelbo | G06F 21/64 |
| 2018/0288536 A1 | 10/2018 | Karunasiri et al. | |

FOREIGN PATENT DOCUMENTS

| | | |
|---|---|---|
| EP | 3013070 | 4/2016 |
| WO | 2008054134 | 5/2008 |
| WO | 2010145698 | 12/2010 |

\* cited by examiner

DISTRIBUTING SOFTWARE AMONG HEARING DEVICES

RELATED APPLICATIONS

The present application claims priority to EP Patent Application No. 19159660.0, filed on Feb. 27, 2019, and entitled "DISTRIBUTING SOFTWARE AMONG HEARING DEVICES," the contents of which are hereby incorporated by reference in their entirety.

BACKGROUND INFORMATION

Hearing devices are generally small and complex devices. Hearing devices can include a processor, microphone, speaker, memory, housing, and other electronical and mechanical components. Some example hearing devices are Behind-The-Ear (BTE), Receiver-In-Canal (RIC), In-The-Ear (ITE), Completely-In-Canal (CIC), and Invisible-In-The-Canal (IIC) devices. Also, a cochlear implant may be seen as a hearing device. A user can prefer one of these hearing devices compared to another device based on hearing loss, aesthetic preferences, lifestyle needs, and budget.

A hearing system typically comprises two binaurally connected hearing devices, which work together as an overall system. In some cases, however, they may assume different complementary roles, operate in slightly different ways and may show different behaviours.

Hearing devices usually obtain their software through a download into a memory at production time. The software image typically includes most of the entire functionality of the hearing devices, including most data and the entire program code, the hearing device could possibly ever make use of, regardless of the later role of the hearing device or final use by an end user.

Hence, the software image may include functionality that is never used by a user, but may occupy valuable memory storage. Moreover, the download time and update time of the software image may be longer than necessary. Each hearing device may load the software into RAM at every boot, which also may consume additional boot-up time and may use up valuable RAM space.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

The embodiments described herein provide a faster and more flexible hearing system. The embodiments described herein may also save memory space in a hearing system.

This is achieved by the subject-matter of the independent claims. Further exemplary embodiments are evident from the dependent claims and the following description.

A first aspect described herein relates to a hearing system comprising a hearing device and a connected device. The connected device also may be a hearing device. One or both of the hearing devices may be worn on and/or in an ear of a user. A hearing device may be a hearing aid, which may be adapted for compensating a hearing loss of the user. Also a cochlear implant may be a hearing device.

The connected device may be a smartphone, smartwatch or other devices carried by the user.

In the case of two hearing devices, both hearing devices may be designed equally, i.e. may have the same hardware. However, it also may be that the hearing devices have different hardware. The hearing devices may be companion devices, which may show a relationship of depending on each other in their functionality, such as a left hearing aid and a right hearing aid.

According to an embodiment, the hearing device or each hearing device comprises a microphone; one or more processors for processing a signal from the microphone; an output device for outputting the processed signal to an ear of the user; a memory for storing program code modules to be processed by the processor; and a transceiver for exchanging data with the connected device (or the other hearing device).

The memory may comprise a volatile memory, which is accessed by the processor, when executing the program code modules, and a non-volatile memory for storing program code modules to be loaded into the volatile memory.

The one or more processors may comprise one or more digital signal processors, which processes a signal from the microphone to compensate a hearing loss of the user. The output device, which outputs the processed signal to the user, may be a loudspeaker or a cochlear implant. The processor may perform the signal processing with program code modules, which are stored in a volatile memory, such as a RAM. Signal processing and also other tasks, such as data communication with other devices, such as the connected device and/or another hearing device, may be performed by the processor.

When specific functionality is required, the corresponding program code modules may be loaded from a non-volatile memory, such as an EPROM and/or FLASH memory, into a volatile memory. Alternatively or additionally, program code modules may reside in a non-volatile memory, such as ROM and/or executable FLASH memory, from where they can be executed directly. In general, a non-volatile memory may be a memory, which keeps the data stored, when disconnected from a power supply, while a volatile memory will be erased in this case.

A program code module may be a piece of software comprising code for software functions and/or data belonging together. For example, a program code module may be stored as a file in the memory. A program code module may comprise executable code and/or data processed by the software, such as configuration data.

A hearing device furthermore may comprise a transceiver for exchanging data with the connected device and/or another hearing device. The transceiver may be a wireless transceiver, for example adapted for data communication via Bluetooth. Also the transceiver may be controlled by the processor via software stored in one or more program code modules.

For example, the sound signal acquired with the hearing device may be digitized, optionally processed and sent to the connected device and/or another hearing device. For binaural signal processing, the sound signals from both hearing devices may be processed in one hearing device in this way. As a further example, sound data, for example, from a telephone call, may be received in the hearing device via the transceiver from the connected device, such as a smartphone. This sound data may be processed by each hearing device and/or output by each hearing device.

According to an embodiment, in the memory of the hearing device a first set of program code modules and in the memory of the connected device a second set of program code modules different from the first set is stored. In other words, both devices do not store the same software in their memories. It may be that some program code modules in the first set are not present in the second set and/or vice versa.

For example, when the connected device is a hearing device, it may be avoided that redundant program code modules, which may be exchanged between the hearing devices, are stored in both hearing devices. Furthermore, it may be avoided that program code modules never used are stored in the hearing devices. For example, a specific hearing program, which may be provided by a program code module, may not be fitted and thus never be enabled for the end user.

According to an embodiment, the hearing system is configured, such that a program code module of the second set of program code modules is transferred from the connected device to the hearing device upon request from the hearing device or the connected device. Unused or redundant data and program code, which consumes memory, may be spared, which may reduce time for downloading the initial program code modules into the hearing device, updating already deployed program code modules and/or loading program code modules into the volatile memory during boot. This may lower the needed overall capacity of the hearing system or may free capacities that may be used for other functionality.

It may be that the two sets of program code modules are complementary. A complementary set of program code modules may contain functionality that complements and/or can be complemented with program code modules of one or more further sets of program code modules. In other words, the software provided by all sets of program code modules may be complete, i.e. may constitute the complete software of the hearing system.

For generating the sets of program code modules, a complete software image for a hearing device, which may comprise code and/or data, may be decomposed into modular software parts, which herein are called program code modules. As already mentioned, a program code module may form a functional unit.

The program code modules may then be combined flexibly into sets of program code modules and loaded at boot or later stage in order to enable specific features as required by a device type (e.g., Receiver-In-Canal (RIC), opposed to In-The-Ear (ITE)). A brand (such as specific feature sets) and/or the end user (such as personal preferences for single programs like phoning, listening to music, or specific binaural programs) may have influence on the content of the software sets.

Redundant program code modules may be removed from the first and second set of program code modules. The sets may be tailored to a specific hearing device, for example to the left hearing device opposed to the right hearing device or to a cochlear implant, and may provide the necessary software functionality only.

According to an embodiment, the first set of program code modules is a minimal bootable firmware image. Such a minimal bootable firmware image may contain a boot module. A boot module may be a program code module that is firstly loaded into the volatile memory and/or that organizes the loading of further program code modules into the volatile memory. The boot module may have a minimal size in data and program code and/or may be booted and run as a self-contained piece of software in the hearing device.

According to an embodiment, the first set of program code modules and the second set of program code modules comprise equal program code modules. This may be the case, when the connected device is a second hearing device. There may be further program code modules, which are stored in both hearing devices. For example, program code modules, which have to be started fast, may be provided in both hearing devices, since the time of transmitting the respective program code module from one hearing device to the other may be omitted. Also, program code modules that are used for monaural signal processing may be provided in both hearing devices, since in this case, no data communication between the hearing devices is then necessary.

According to an embodiment, the first set of program code modules and the second set of program code modules comprise different program code modules. These different program code modules may be seen as complementary parts of the software stored in the two hearing devices. A program code module that is only stored in one of the hearing devices may be a program code module only used with this device. However, it also may be a program code module used by both devices.

According to an embodiment, the first and/or the second set of program code modules comprise program code modules with executable code. Executable code may be program code to be executed by the one or more processors of the hearing device.

According to an embodiment, the first and/or the second set of program code modules comprise data, which may be data to be processed by executable code. Such data may comprise acoustical configuration data, system configuration data, communication configuration data, logging data and/or audio data.

Acoustical configuration data may comprise attenuation parameters for the digital signal processor. These parameters may be adjusted during fitting.

System configuration data may control the interaction of the devices which each other. Such configuration data may be generated during configuration of the hearing system.

Communication configuration data may comprise pairing-information, passwords, etc.

Logging data may be generated by the devices. Logging data may be read out by a manufacturing and/or by a fitting system.

Audio data may comprise digitized sound signal, for example produced by the microphones mentioned herein. There also may be audio data for information of the user about the hearing system, which may be loaded by the user from a different source, such as the Internet.

According to an embodiment, the hearing system further comprises one or more user devices to be carried by the user. Such a user device may be a tablet computer, a smartphone, a device in a clip that may be attached to one of the hearing devices, etc. The user device may be adapted for performing telephone calls and/or for connecting to the Internet. Also, one of the hearing devices or both hearing devices directly may connect to the Internet, for example via a transceiver for transmitting data via WLAN.

It may be that the connected device is a first user device and that the user device mentioned above is a second user device. It also may be that the connected device is a second hearing device and/or that the user device communicates with both hearing devices.

According to an embodiment, a user device comprises a transceiver for transmitting data to the hearing device and/or the connected device. For example, digital signals from a telephone call may be transmitted to one or two hearing devices. Furthermore, configuration data and/or software, such as software updates, may be transmitted to the one or two hearing devices. In general, such a data transfer may be wired via cable or wireless, for example via Bluetooth.

According to an embodiment, a user device comprises a memory, in which a third set of program code modules to be loaded into the memory of at least one of the hearing devices is stored. It may be that program code modules are not stored in the hearing devices at all, but stored in a user device, which may transmit the program code modules to one or both of the hearing devices. It also may be that program code modules are transmitted via Internet to the user device.

In the case, one of or both of the hearing devices are directly connected to Internet, also the program code modules may be transmitted directly to the hearing devices.

When one or both of the hearing devices may have to be provided with the functionality of a program code module stored in the user device, the program code module may be transmitted with the transceiver of the user device and the respective hearing device to the hearing device. In the hearing device, the program code module may be stored in the memory, i.e. it may be possible that the functionality is lost, when the hearing device is shut down.

However, it also may be that a program code module transmitted from the user device to the hearing device is stored in the non-volatile memory of the hearing device.

In general, parts of the software stored in the hearing devices and the one or more user devices (i.e. program code modules) may be distributed and shared between these devices. It also may be that program code modules are distributed across a networked system, in particular the Internet.

It also may be that program code modules, which may be used not simultaneously, may be stored in different devices, such as the hearing devices and/or the one or more user devices. For example, such program code modules may relate to monaural and binaural signal processing. The first set of program code modules may comprise at least one program code module for monaural signal processing and/or the second set of program code modules may comprise at least one program code module for binaural signal processing, or vice versa.

It also may be that program code modules, which may be used simultaneously, e.g. to complement each other, may be stored in different devices, such as the hearing devices and/or the one or more user devices. For example, a first set of program code modules, including at least one program code module for monaural signal processing, may not only be loaded and used in the hearing device but also in a second hearing device. A second set of program code modules, including at least one (incremental) program code module for binaural signal processing, which may complement the program code modules for monaural signal processing and thus allows for binaural signal processing, may in turn not only be loaded and used on the second hearing device but also on the first hearing device.

A further aspect described herein relates to a method for storing and/or distributing software in a hearing system, for example such as described in the above and in the following. The method may be a computer-implemented method, which may be performed automatically by the hearing system. The hearing system as described in the above and in the below may be adapted for performing the method.

According to an embodiment, the method comprises: executing a first program code module from the first set of program code modules stored in the memory of the hearing device with the processor of the hearing device. The first program code module may be loaded from the first set of program code modules, which is stored in the non-volatile memory of the hearing device into the volatile memory of the hearing device.

Analogously, a further program code module from the second set of program code modules stored in the memory of the connected device may be executed with the processor of the connected device. In other words, when demanded and/or needed, a program code module stored in a hearing device (or connected device) also may be executed in this hearing device (or the connected device).

According to an embodiment, the method further comprises: sending a further program code module from the second set of program code modules stored in the connected device to the hearing device and executing the further program code module with the processor of the hearing device.

Analogously, the method may further comprise: sending a second program code module from the first set of program code modules to the connected device and executing the second program code module with a processor of the connected device. The first program code module from the first set of program code modules may be directly loaded into the volatile memory of the connected device.

In other words, a program code module stored in the hearing device and/or the connected device may be sent via the transceiver to the other device and executed there.

According to an embodiment, the method further comprises: sending a further program code module from the third set of program code modules stored in the memory of the user device to the hearing device and/or connected device and executing the further program code module with a processor of the hearing device and/or the connected device. It may be that the further program code module is directly loaded into the volatile memory of the hearing device and/or the connected device. Program code modules stored in the user device may be loaded into one or both of the devices via the respective transceiver and may be executed there.

According to an embodiment, the method further comprises: during production of the hearing device, storing solely a boot module in the memory of the hearing device and in the memory of the hearing device. It may be that only a small part of the overall available software is stored in a hearing device during production. Here, production may mean the assembly and test of the hearing device, before it is shipped to a shop and/or to an end user.

According to an embodiment, the method further comprises: during usage of the first hearing device and the connected device, storing different program code modules in the memory of the hearing device and in the memory of the connected device. Usage may be fitting and/or operation of the hearing system.

For example, a hearing device with only a boot module and/or a minimal bootable firmware image may be supplemented with further program code modules during fitting of the hearing system. A hearing care specialist may chose the program code modules, which may be needed and/or appropriate for a specific user of the hearing system. The chosen program code modules may be distributed among the (hearing) devices. It may be that each program code module is provided with information, in which hearing device, i.e. the first, the second or both, it should be stored. A fitting device may send the respective program code modules to the respective hearing device, such that it is stored there in the memory.

It also may be that the hearing system is provided with further program code modules via the user device, when a user chooses further functionality during operation of the hearing system. For example, a program code module stored in the user device and/or available per download via Internet, may be stored in one or both of the hearing device and the connected device.

It also may be that during the usage of the hearing system, program code modules are stored in the non-volatile memory of the user device belonging to the hearing system. For example, the respective program code module may be downloaded from the Internet and stored in the user device. It also may be that a program code module, which is stored in a hearing device, is stored in the non-volatile memory of the user device and, for example, then deleted in the hearing device. In such a way, a for example not so often used program code module may be swapped to the user device, thus freeing memory in the hearing device.

Further aspects described herein relate to a computer program for storing and/or distributing software in a hearing system, which, when being executed by a processor, is adapted to carry out the steps of the method as described in the above and in the following as well as to a computer-readable medium, in which such a computer program is stored.

For example, the computer program may be executed in processors on one or on both hearing devices and optionally in processors of one or several user devices. The computer-readable medium may be the volatile and/or non-volatile memory of the hearing devices and optionally of the user devices. It may be that steps of the method are performed by one of the hearing devices and other steps of the method are performed by the other one of the hearing devices and/or the user devices.

It may be that program code modules of the first set, second set and/or third set of program code modules provide the computer-program, i.e. that the program code modules are adapted for performing the method.

In general, a computer-readable medium may be a floppy disk, a hard disk, an USB (Universal Serial Bus) storage device, a RAM (Random Access Memory), a ROM (Read Only Memory), an EPROM (Erasable Programmable Read Only Memory), an EEPROM (Electrically Erasable Programmable Read Only Memory) or a FLASH memory. A computer-readable medium may also be a data communication network, e.g. the Internet, which allows downloading a program code. The computer-readable medium may be a non-transitory or transitory medium.

It has to be understood that features of the method as described in the above and in the following may be features of the computer program, the computer-readable medium and the hearing system as described in the above and in the following, and vice versa.

These and other aspects described herein will be apparent from and elucidated with reference to the embodiments described hereinafter.

Figure 1:
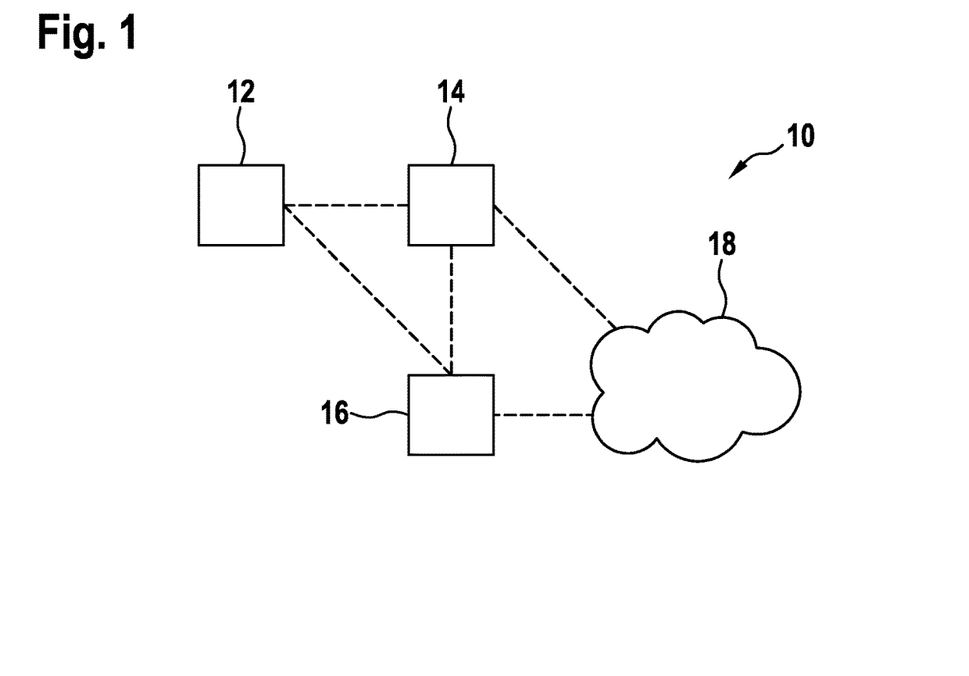
FIG. 1 schematically shows a hearing system according to an embodiment.

FIG. 1 shows a hearing system 10, which comprises two hearing devices 12, 14 and a user device 16.

Each of the two hearing devices 12, 14 may be worn be a user behind the ear and/or in the ear. For example, the hearing device 12 may be a left hearing device for the left ear and the hearing device 14 may be a right hearing device for the right ear. Both hearing devices 12, 14 may constitute a binaural hearing system. The hearing devices 12, 14 may be hearing aids adapted for compensating a hearing loss of the user. The two hearing devices 12, 14 are adapted for exchanging data wirelessly as indicated by the dashed line, for example via Bluetooth. For example, it may be that an audio signal acquired and/or processed by the first hearing device 12 may be transmitted to the second hearing device 14, and vice versa.

The user device 16, which may be a tablet computer or smartphone, also may be adapted for exchanging data wirelessly with one or both of the hearing devices 12, 14, for example via Bluetooth. Furthermore, the hearing devices 12, 14 and/or the user device 16 may be adapted for exchanging data with one or more data communication networks 18, such as the Internet and/or a telephone network. For example, the user device 16 may receive data from a phone call, which encodes an audio signal, and may forward this data and/or the audio signal to one or both of the hearing devices 12, 14. A user device 16 also may be a clip or shoe that, for example, may be connected to a portable microphone or a hearing device 12, 14 itself.

Figure 2:
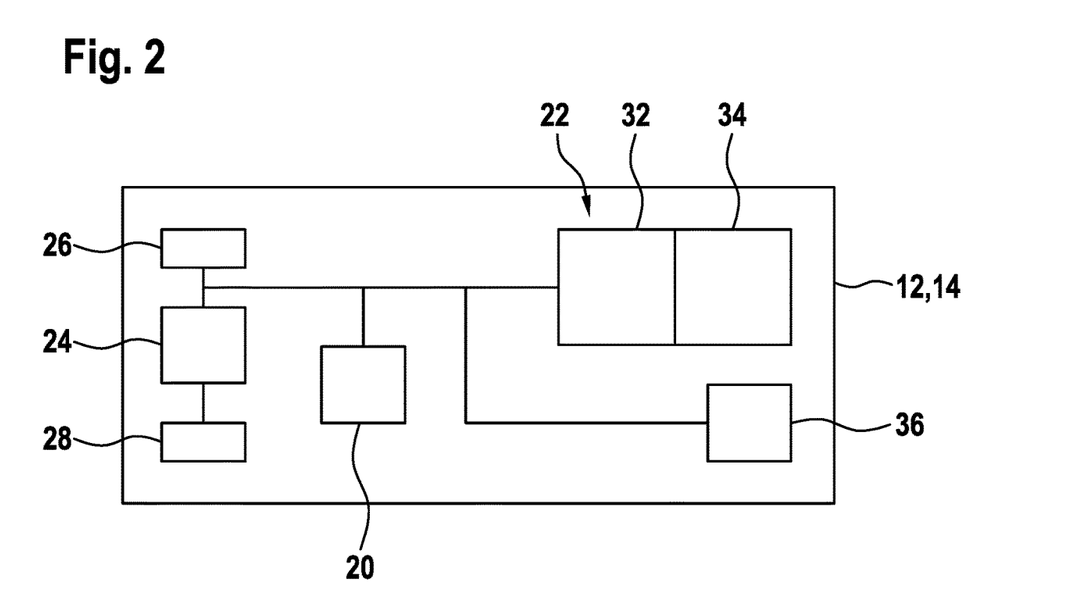
FIG. 2 schematically shows a hearing device for the hearing system of FIG. 1.

FIG. 2 shows schematically hardware components of the hearing devices 12, 14. The hearing devices 12, 14 may be equally or differently designed, i.e. may comprise the same hardware components or different hardware components.

The hearing devices 12, 14 comprise one or more processors, such as a processor 20 that may be a microcontroller, which is adapted for executing software stored in a memory 22. A digital signal processor 24 processes audio signals received from one or more microphones 26. The processed sound signal may be output by an output device 28, such as a loudspeaker or cochlear implant.

The memory 22, which is directly accessible by the processor 20, may comprise a volatile memory 32, such as a RAM, and a non-volatile memory 34, which may be seen as a persistent storage.

The hearing devices 12, 14 furthermore comprise a transceiver 36 for wireless data exchange. Data may be transferred between the memory 22, such as the volatile memory 32, the non-volatile memory 34, and the transceiver 36.

Via the transceiver 36, digital sound signals and software, such as a software image, program code modules, program code, data, may be loaded into the volatile memory 32 and/or the non-volatile memory 34. Furthermore, software may be loaded from the non-volatile memory 34 into the volatile memory 32. Instructions and data may be loaded from the volatile memory 32 to registers of the processor's CPU for code execution.

Figure 3:
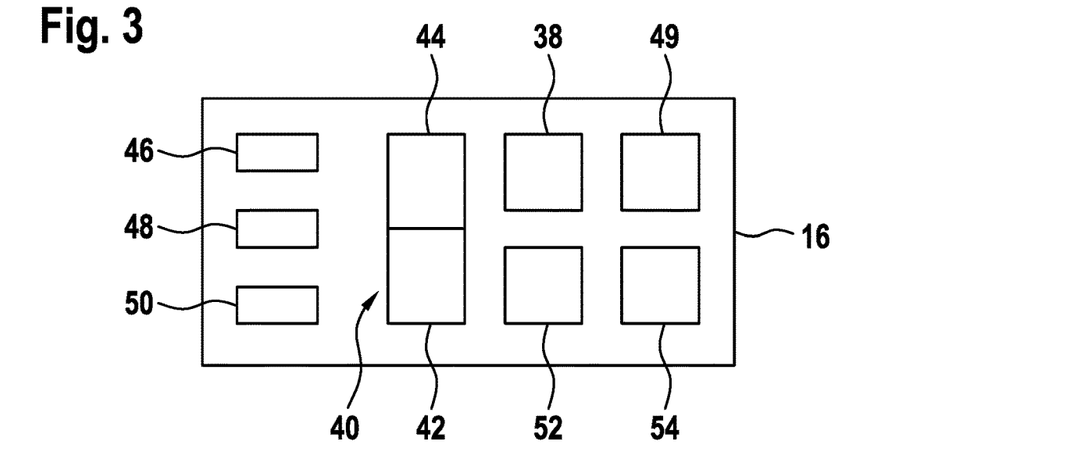
FIG. 3 schematically shows a user device for the hearing system of FIG. 1.

FIG. 3 shows schematically hardware components of the user device 16. As the hearing devices 12, 14, the user device 16 comprises one or more processors 38 and a memory 40, which may be composed of a volatile memory 42 and a non-volatile memory 44. The user device 16 furthermore may comprise input and output devices for interaction with the user, such as a microphone 46, a loudspeaker 48, buttons 49 and a display 50. One or more senders/receivers 52, 54 for data communication are present. A transceiver 52 may be adapted for communicating with the hearing devices 12, 14, for example via Bluetooth. A further transceiver 54 may be adapted for example for communication with a wireless telephone network, for example via GSM.

For example, the user device 16 may be a smartphone. Digital audio data may be received via the transceiver 54 and output by the loudspeaker 48 and/or transferred to one or both hearing devices 12, 14 via the transceiver 52. Other data, such as software images and/or program code modules, and digital audio data may be received via the transceiver 54 and stored in the non-volatile memory 44 and/or sent to one or both hearing devices 12, 14 via the transceiver 52.

Figure 4:
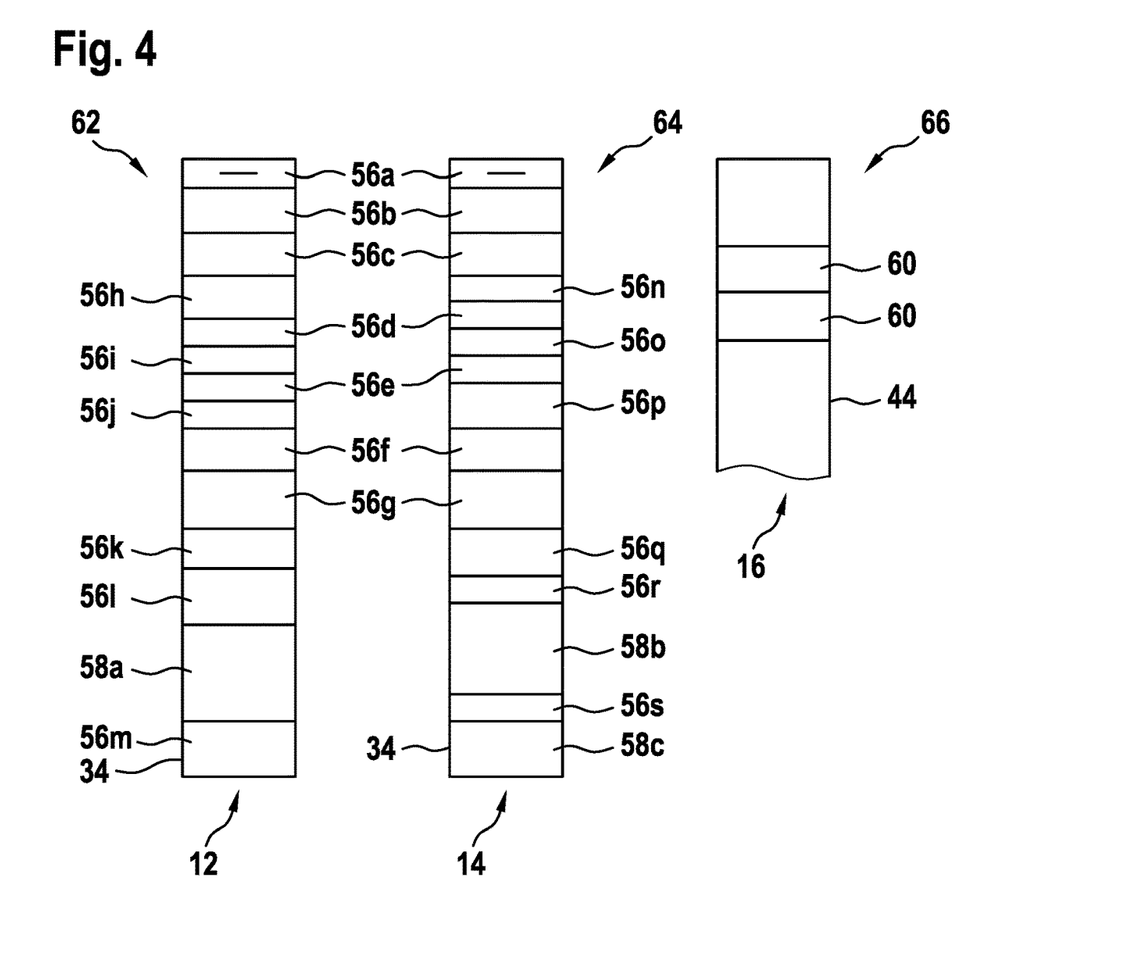
FIG. 4 schematically shows memories of a hearing system according to an embodiment.

FIG. 4 shows a possible content of the non-volatile memories 34 of the hearing devices 12, 14 and the non-volatile memory 44 of the user device 16.

The software, i.e. executable code, configuration data, data to be processed by the executable code, etc., is divided into program code modules 56, which may be stored separately from each other in the respective non-volatile memory, for example as a file.

The non-volatile memories 34 both comprise a boot module 56*a* and a file allocation table (FAT) 56*b*.

The other program code modules may be stored after the file allocation table 56*b*.

For an exemplary embodiment, both volatile memories 34 include
- a program code module 56*c* for control code,
- a program code module 56*d* for code for audio processing,
- a program code module 56*e* for code for wireless communication,
- a program code module 56*f* for configuration data,
- a program code module 56*g* for audio processing parameter data.

Each of the program code modules 56*c* to 56*g* has the same content in the respective non-volatile memory 34 of the two hearing devices 12, 14.

The non-volatile memory 34 of the hearing device 12 furthermore includes
- a program code module 56*h* for monaural control code,
- a program code module 56*i* for code for monaural audio processing,
- a program code module 56*j* for code for monaural wireless communication,
- a program code module 56*k* for monaural configuration data,
- a program code module 56I for monaural audio processing parameter data.

In the remaining space of the non-volatile memory 34 of the hearing device 12, further software, such as monaural voice messages 58*a*, and further program code modules 56*m*, for example also relating to monaural functionality may be stored.

The non-volatile memory 34 of the second hearing device 14 additionally includes
- a program code module 56*n* for binaural control code,
- a program code module 56*o* for code for binaural audio processing,
- a program code module 56*p* for code for binaural wireless communication,
- a program code module 56*q* for binaural configuration data,
- a program code module 56*r* for binaural audio processing parameter data.

In the remaining space of the non-volatile memories 34 of the second hearing device 14, further software, such as binaural voice messages 58*b*, other files 58*c*, such as user data, sound files, etc., and further program code modules 56*s*, for example also relating to binaural functionality may be stored.

The above described lists of modules are one of many possible embodiments. It may be that only the boot module and some minimal additional code for wireless communication, including sending and receiving data or code parts, may be the only common program code modules. All other program code modules may be complementary, such that each of the two hearing devices 12, 14 may have to load the complementary set of program code modules from the other hearing device 12, 14.

The software in the first hearing device 12 and the second hearing device 14 may be complementary in a sense that, besides the common program code modules, the first hearing device 12 solely stores program code modules relating to monaural functionality and the second hearing device 14 stores program code modules relating to binaural functionality.

The non-volatile memory 44 of the user device 16 includes software for providing the functionality of the user device, such as telephone, Internet access, etc. In FIG. 4, it is only indicated that program code modules 60 may be stored in the non-volatile memory 44, which, however, include code and/or data, which are processable by the hearing devices 12, 14. For example, the code contained in program code modules 60 may not be executable by the user device 16.

The program code modules 56 stored in the non-volatile memory 34 of the first hearing device 12 may be seen as a first set 62 of program code modules. The program code modules 56 stored in the non-volatile memory 34 of the second hearing device 14 may be seen as a second set 64 of program code modules. The program code modules 60 stored in the non-volatile memory 44 of the user device 16 may be seen as a third set 66 of program code modules.

The sets 62, 64, 66 of program code modules 56 may provide a complete set of program code modules 56, which are adapted for providing a complete functionality of the hearing system 10. Program code modules 56 stored solely in one of the devices 12, 14, 16 may be distributed via the transceivers 36, 52 to another one of the devices 12, 14, 16 and stored there in volatile or non-volatile memory. In such a way, every program code module 56 may be executed in every hearing device 12, 14, when necessary.

The separation of program code modules 56 may be vertically across layers, for example including all involved subcomponents, such as a processor 20, digital signal processor (DSP) 24 and/or radio chip 36, and/or may be horizontally across functionalities, for example depending on the same or different functionality. For example, the software may be componentized into individual program code modules 56, including control, audio processing and wireless communication.

For wireless communication, the program code modules 56 may be split into parts for Bluetooth communication and communication via proprietary wireless protocols, such as binaural streaming or media broadcasting.

For control, the program code modules 56 may be split into parts for user interfaces and hearing programs, for power management or communication via I2C or other proprietary buses, among others.

For audio processing, the program code modules 56 may be split into parts for acoustic hearing programs and digital signal processing, such as beamforming or noise reduction.

Figure 5:
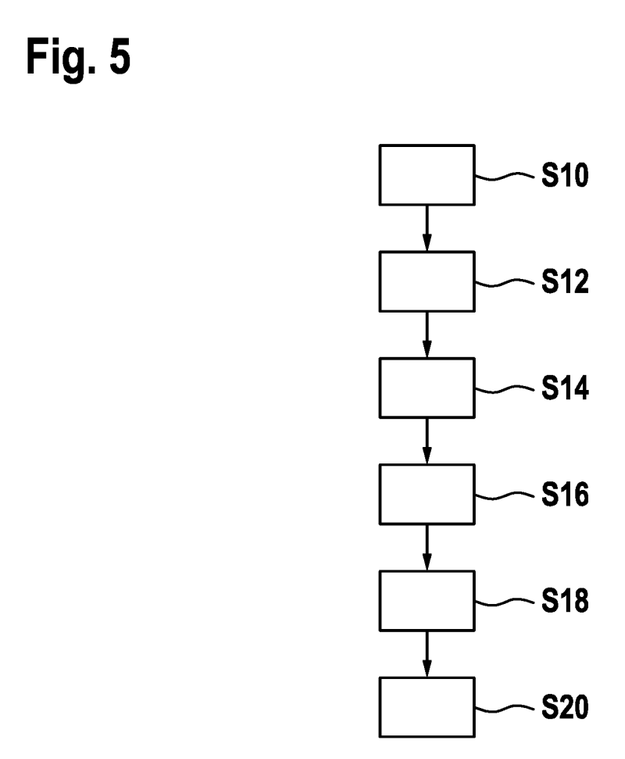
FIG. 5 shows a flow diagram for a method for storing and/or distributing software in a hearing system according to an embodiment.

FIG. 5 shows a flow diagram for a method for storing and/or distributing software in the hearing system 10.

In step S10, during production of the hearing device 12 and the second hearing device 14, solely a boot module 56*a* is stored in the non-volatile memory 34 of the first hearing device 12 and in the non-volatile memory 34 of the second hearing device 14.

For example, at production time, a minimal software, such as the boot module 56*a*, may be downloaded from a production device to the non-volatile memory 34. Parts of the software may be combined in such a way as to form an initial minimal bootable software image, which may be an image of minimal size in data and program code that can be booted up and run as a self-contained application in the hearing device 12, 14.

In step S12, during usage of the first hearing device 12 and the second hearing device 14, equal and/or different program code modules 56a to 56s are stored in the non-volatile memory 34 of the first hearing device 12 and in the non-volatile memory 34 of the second hearing device 14. The term "usage" may refer to a fitting session of the hearing devices 12, 14 and an operation of the hearing devices 12, 14 by a user.

For example at the office of a hearing care professional, the software in the hearing devices 12, 14 may be finalized by downloading customized software, which adjusts the pre-installed minimal image, from the fitting station to the non-volatile memory 34. When the hearing devices 12, 14 have been shipped, the hearing care professional may boot, detect and connect the hearing devices 12, 14 and/or may adjust the pre-installed minimal software to the user's need by downloading additionally required software parts, such as the program code modules 56b to 56s.

For example, the user may choose not to use a specific functionality and/or feature, such as voice message software, and the corresponding program code modules may not be stored in the hearing devices 12, 14.

For example, different feature sets according to a brand and/or other system variations may be chosen and the corresponding program code modules 56 may be assembled. In this way, it may be ensured that a fully functional software image is downloaded to the hearing devices 12, 14. For an exemplary embodiment, the fully functional software image and/or a complete software image may be composed of all the program code modules 56a to 56s of the sets 62, 64 and optionally 66 of program code modules.

Only the minimal bootable software image, which may be really needed for production, may be deployed initially, and the software may be customized later only once more functionality is required. This approach may offer advantages over downloading the complete software image already early in production, such as reduction of software download time in production, and savings in used non-volatile memory 34.

For example, the two hearing devices 12, 14 may be fitted as a binaural hearing device system at the office of a hearing care professional. Each of the two hearing devices 12, 14 may contain a pre-installed minimal bootable software image, comprising the fundamental software parts that allow for download and boot. Note that the minimal bootable software image may be independent of the left or right hearing device configuration.

The hearing care professional may perform load balancing for the sets 62, 64 of program code modules 56. The hearing care professional may also consider the set 66, when balancing the software.

Basically, even more than three devices could be involved in this process of software balancing. The software may be balanced among three or more devices, for example also including the user device 16 besides the hearing devices 12, 14. The fitting station and fitting software may support the hearing care professional and/or may offer a user-friendly way of customizing and balancing software by guiding through the feature selection process and automatically matching the first and second set 62, 64 of program code modules 56.

Generally speaking, code and data, such as configuration data, which are relevant for the operation of a single hearing device 12, 14, may be placed on both hearing devices 12, 14. Code and data, which are relevant for the operation of the binaural hearing device system (such as binaural programs), may be only placed on one hearing device 12, 14 in the system (such as code and data that allows for binaural voice streaming and binaural beamforming).

FIG. 4 visualizes two different allocations of non-volatile memory 34 of a binaural hearing device system for an exemplary embodiment, and shows how much storage space may be gained as a result of software balancing. For this exemplary embodiment, the right hearing device 14 may be configured as binaural counterpart. It may rely on the left hearing device 12 for supporting the full feature set but also may provide the complementary software for any binaural functionality to be used in the binaural hearing device system.

Sharing program code modules 56 may remove redundancy in the software and may lead to a gained storage space, which can be utilized for various additional functionalities (given the same total size of the non-volatile memory 34), such as code for new features, increased number of pairings (e.g., Bluetooth addresses and keys), voice messages or other sound files, and user data in general.

Returning to FIG. 5, the following steps of the method may be automatically performed by the hearing system 10. In particular, the method may be a computer program, which, for example, may be stored in the program code modules 56a and/or 56c.

In step S14, a first program code module 56 is loaded from the first set 62 of program code modules stored in the non-volatile memory 34 of the first hearing device 12 into the volatile memory 32 of the first hearing device 12. After that, the first program code module 56a to 56m is executed with the processor 20 of the first hearing device 12.

In step S16, a second program code module 56h to 56m is sent from the first set 62 of program code modules to the second hearing device 14. The second program code module 56h to 56m is loaded into the volatile memory 32 of the second hearing device 14. After that, the second program code module 56h to 56m is executed with the processor 20 of the connected device 14.

In step S18, a further program code module 56n to 56s is sent from the second set 64 of program code modules stored in the second hearing device 14 to the first hearing device 12. The further program code module 56n to 56s is loaded into the volatile memory 32 of the hearing device 12. After that, the further program code module 56n to 56s is executed with the processor 20 of the first hearing device 12.

As already mentioned, the hearing devices 12, 14 may be part of a binaural hearing device system and at fitting time, the feature set of the binaural hearing device system may be defined and the respective program code modules 56 may be downloaded to the hearing devices 12, 14, as described with respect to steps S10 and S12.

Load balancing for the sets 62, 64 of program code modules of two binaurally connected hearing devices 12, 14 may imply that the hearing devices 12, 14 cooperate as a single distributed system. The hearing devices 12, 14 may serve each other as mutual persistent storage location and may share program code modules 56 at runtime.

Each of the sets 62, 64 may be downloaded to the non-volatile memory 34 of the respective hearing device 12, 14. After boot-up, the hearing devices 12, 14 may detect a connected contralateral hearing device 12 and—on demand—may complement its software with data and program code provided by the contralateral hearing device 12, 14. The hearing devices 12, 14 may cooperate as a single distributed system and/or may serve each other as mutual persistent storage location. A hearing device 12, 14 may include the contralateral hearing device 12, 14 in its memory map and/or may load program code modules 56 at runtime from the other hearing device 12, 14 via the binaural link, which may be provided by the transceiver 36, into its own volatile memory 32.

The distribution and balancing of software between hearing devices 12, 14 may offer the following advantages: A boot time may be reduced since the loading of some program code modules 56 at boot may be postponed. They may be loaded to RAM later on demand, i.e. only when they are actually used by the respective hearing device 12, 14. Further, used non-volatile memory 34 and volatile memory 32 may be saved.

During operation of the binaural hearing device system, the hearing devices do not come up without the full feature set, for example the program code modules 56 for the binaural features are not loaded yet. After boot-up, the hearing devices 12, 14 may check for the presence of a binaurally paired hearing device 12, 14 and, if in range, may establish a connection to each other. Each hearing device 12, 14 may initiate a procedure to load complementary program code modules 56 (such as code and data that enable binaural voice streaming) from the contralateral hearing devices 12, 14 via the established binaural link into its volatile memory 32.

There may be several possibilities in how the binaural exchange of complementary program code modules 56 may be realized. Besides data transfer through the binaural link, data like voice messages may be compressed for transfer and uncompressed for playing on the other side, or be exchanged binaurally via audio streaming directly.

In step S20, a further program code module 60 from a third set 66 of program code modules stored in a volatile and/or non-volatile memory, 42 respectively 44, of a user device 16 is sent to the first hearing device 12 and/or second hearing device 14. The further program code module 60 is loaded into a volatile and/or non-volatile memory, 32 respectively 34, of the first hearing device 12 and/or the second hearing device 14. After that, the further program code module 60 is executed with a processor 20 of the first hearing device 12 and/or the second hearing device 14.

In general, the concept of complementary software may be expanded to further connected devices other than the contralateral hearing devices 12, 14, namely one or more external remote user devices 16 that are connected to a single hearing device 12 or to both hearing devices 12, 14, respectively.

Furthermore, in the above and below, the functionality described with respect to the second hearing device 14 may also be performed by a general connected device, which not necessarily is a hearing device 14. It also may be that one of the user devices 16 is seen as a connected device.

Again, with respect to FIG. 4, the hearing care professional and/or the fitting station may configure the software images and/or the sets 62, 64, 66 of program code modules prior to download. A software image balance may not only be considered with respect to the hearing devices 12, 14 alone. Also, resources of a user device 16, of a user remote from the hearing devices 12, 14 may be considered.

Now the overall hearing system 10, including the binaural system of the hearing devices 12, 14 and the additional user device 16 may cooperate in sharing program code and data. All involved devices 12, 14, 16 may form a network, which may behave like a single system, when seen from the outside: besides the two hearing devices 12, 14 among themselves, each hearing device 12, 14 may share complementary program code modules 56 with one or more several user devices.

The software may be distributed in such a way that it is off-loaded from a less powerful device onto a device with more resources. For example, the hearing devices 12, 14 may load some additional code and data remotely from a user device at runtime. Note that remotely loaded code or data, i.e. program code modules 60, may or may not be persisted on the hearing devices 12, 14, i.e. may be solely stored in the volatile memory 32. These program code modules 60 may get lost at power off and/or may be intended for being loaded anew at each reboot.

It may be that the hearing care professional gets support by a fitting software and optionally a mobile application stored in the user device 16. The fitting software may balance the program code modules 56 across the hearing devices 12, 14 and the one or more user devices 16. Once an instance of the mobile application may have been installed on one or several user devices 16, the fitting software may communicate with each application in order to place code and/or data, i.e. program code modules 60, of complementary software on the one or more user devices 16.

At runtime, when the hearing devices 12, 14 and the one or more user devices 16 connect, program code modules 60 can be loaded by the mobile application back to the hearing devices 12, 14.

There are varied degrees in sharing complementary software, which may lead to tighter or looser coupling between a hearing device 12, 14 and a user device 16. The hearing device 12, 14 may need to connect to the user device 16 during boot-up in order to load remotely stored but basically essential program code modules 60. An example may be the loading of an alternative software image (e.g., for emulating a hearing device of a higher price class) from a smartphone, which a hearing care professional or user may have downloaded previously via an app onto the smartphone from a fitting station or the Internet.

A less tight coupling may be provided by a user device 16, which enables additional program code modules 60 that rather extend the basic functionality. For example, a user device may provide program code modules 60 to a hearing device 12, 14 that add a specific feature on the hearing device 12, 14, which makes use of new (such as a new type of a communication module or sensors like GPS or IMU) and/or enhanced (such as a more powerful processor, additional user interfaces) hardware components of the user device 16.

A user device 16 may provide program code modules 60 that enable a new use case that only becomes available after the user device 16 itself has been present and connected to the network. For example only, when a smartphone or tablet connects with a hearing device 12, 14, it may be beneficial that the hearing device 12, 14 loads program code modules 60 to support phone calls and/or audio streaming.

A user device 16 may provide program code modules 60 to a hearing device 12, 14 that allow for making use of new functionality that may be not strictly related to enabling hardware. Such additional program code modules 60 may provide unlocking features for the participation in a pilot study and/or in a trial phase, as well as by purchasing addons or upgrades for specific brands and/or device classes for extended feature sets. The user device 16 may unlock a new functionality by its presence and may also bring along the related program code modules 60 required for that functionality to work with the hearing devices 12, 14.

It may be that only data is loaded to the hearing devices 12, 14 at runtime from the user devices 16. Such data may be the result of off-loaded complementary software, including procedures or algorithms, running on a user device 16. An example of such a procedure is an end-user adjustments to audiological characteristics of the hearing devices 12, 14 via modifiers in a mobile application. Another example of an algorithm may be a neuronal network based classifier that may rely on more powerful devices like smartphones or tablets to compute and periodically send data to the hearing devices 12, 14, which support the original classifier of a hearing device 12, 14 with more accurate updates. However, data may also be sound files and/or voice messages stored on and loaded from a smartphone.

Sharing of program code modules 60 between hearing devices 12, 14 and other user devices 16 may offer the following additional advantages. Off-loading may allow not only to save memory 32, 34, and balance the storage and memory usage, but also may allow to extend the storage size, and thus the functionality. Being capable of network booting as well as loading program code modules 60 from user devices 16 into the volatile memory 32 of hearing devices 12, 14 on demand may open up the possibility to provide new features via a mobile application from the distance, including distance support and remote fitting by a hearing care professional as well as download of program code modules 60 from the Internet.

As a further embodiment, a program code module 60 may be loaded from the user device 16 into the non-volatile memory 34 of a hearing device 12, 14. For example, the end user may update persistent program code modules 60 via a mobile application on his smartphone. The newly installed program code modules 56 then may be loaded at reboot of the hearing devices 12, 14, and may be used from now on.

Due to the gained memory space in the non-volatile memory 34 of a hearing device 12, 14, the non-volatile memory 34 may be used to store more security-related data, such as longer keys, which may allow for more secure pairings (such as replacing Bluetooth Classic and BLE legacy pairings by more advanced pairing mechanisms, such as Simple Secure and Secure Connection pairings). Keys and other data may also be distributed among the hearing devices 12, 14 and optionally the user device 16, such that, for example, each hearing device 12, 14 in a binaural hearing device system may only know half of the information. Similarly, private user data may be distributed for improving privacy, since the devices 12, 14, 16 may need each other to assemble the entire information.

For example, only if the portable device 16 notifies the hearing device 12 by fulfilling a given protocol (as secondary verification) and the hearing 12 device informs the other hearing device 14, the portable device 16 may finally succeed in getting approved by the other hearing device 14.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A hearing system comprising a first hearing device and a second hearing device, wherein the first hearing device and the second hearing device comprises:
   a microphone;
   a processor for processing a signal from the microphone;
   an output device for outputting the processed signal to an ear of the user;
   a memory for storing program code modules to be processed by the processor, a program code module comprising executable code;
   a transceiver for exchanging data with another hearing device;
   wherein in the memory of the first hearing device a first set of program code modules and in the memory of the second hearing device a second set of program code modules different from the first set is stored, the first set of program code modules and the second set of program code modules comprising different program code modules;
   wherein the hearing system is adapted for:
   executing a first program code module from the first set of program code modules stored in the memory of the first hearing device with a processor of the first hearing device;
   sending a further program code module of the second set of program code modules from the second hearing device to the first hearing device upon request from the first hearing device or the second hearing device;
   executing the further program code module with a processor of the first hearing device;
   sending a second program code module from the first set of program code modules to the second hearing device;
   executing the second program code module with a processor of the second hearing device.

2. The hearing system of claim 1,
   wherein the first set of program code modules and the second set of program code modules comprise equal program code modules.

3. The hearing system of claim 1,
   wherein the first set of program code modules comprises at least one program code module for monaural signal processing; and/or
   wherein the second set of program code modules comprises at least one program code module for binaural signal processing.

4. The hearing system of claim 1, further comprising:
   a user device to be carried by the user;
   wherein the user device comprises a memory, in which a third set of program code modules to be loaded into the memory of at least one of the first and second hearing devices is stored;
   wherein the user device comprises a transceiver for exchanging data with the first hearing device and/or the second hearing device.

5. A method for distributing software in a hearing system that comprises a first hearing device and a second hearing device, the method comprising:
   executing, with a processor of the first hearing device, a first program code module from a first set of program code modules stored in the first hearing device;
   sending a further program code module from a second set of program code modules stored in the second hearing device to the first hearing device;

executing the further program code module with the processor of the first hearing device;

sending a second program code module from the first set of program code modules to the second hearing device;

executing the second program code module with the processor of the second hearing device.

6. The method of claim 5, further comprising:

sending a further program code module from a third set of program code modules stored in a memory of a user device to the first hearing device and/or the second hearing device;

executing the further program code module with a processor of the first hearing device and/or the second hearing device.

7. The method of claim 5, further comprising:

during production of the first hearing device and the second hearing device, storing solely a boot module in a memory of the first hearing device.

8. The method of claim 5, further comprising:

during usage of the first hearing device and the second hearing device, storing different program code modules in a memory of the first hearing device and in a memory of the second hearing device.

9. A non-transitory computer-readable medium storing a computer program that, when executed, direct:

a processor of a first hearing device to execute a first program code module from a first set of program code modules stored in the first hearing device;

a processor of a second hearing device to send a further program code module from a second set of program code modules stored in the second hearing device to the first hearing device;

the processor of the first hearing device to execute the further program code module;

the processor of the first hearing device to send a second program code module from the first set of program code modules to the second hearing device;

the processor of the second hearing device to execute the second program code module.

10. The non-transitory computer-readable medium of claim 9, wherein the computer program, when executed, further directs:

a processor of a user device to send a further program code module from a third set of program code modules stored in a memory of the user device to the first hearing device and/or the second hearing device;

the processor of the first hearing device and/or the processor of the second hearing device to execute the further program code module.

11. The non-transitory computer-readable medium of claim 9, wherein the computer program, when executed, further directs:

the processor of the first hearing device to, during production of the first hearing device and the second hearing device, store solely a boot module in a memory of the first hearing device.

12. The non-transitory computer-readable medium of claim 9, wherein the computer program, when executed, further directs:

the processors of the first and second hearing devices to, during usage of the first hearing device and the second hearing device, store different program code modules in a memory of the first hearing device and in a memory of the second hearing device.

* * * * *